July 9, 1946.　　　S. M. MacNEILLE　　　2,403,731
BEAM SPLITTER
Filed April 1, 1943　　　3 Sheets-Sheet 1

STEPHEN M. MACNEILLE
INVENTOR
BY
ATTY & AG'T

July 9, 1946. S. M. MacNEILLE 2,403,731
BEAM SPLITTER
Filed April 1, 1943   3 Sheets-Sheet 2

STEPHEN M. MACNEILLE
INVENTOR
BY
ATT'Y & AG'T

July 9, 1946.  S. M. MacNEILLE  2,403,731
BEAM SPLITTER
Filed April 1, 1943  3 Sheets-Sheet 3

STEPHEN M. MacNEILLE
INVENTOR

Patented July 9, 1946

2,403,731

UNITED STATES PATENT OFFICE 2,403,731

BEAM SPLITTER

Stephen M. MacNeille, Rochester, N. Y., assignor to Eastman Kodak Company, Rochester, N. Y., a corporation of New Jersey Application April 1, 1943, Serial No. 481,391

12 Claims. (Cl. 88—65)

This invention relates to beam splitters, particularly those of the type used in range finders.

It is an object of the invention to provide a beam splitter in which the reflected and transmitted rays are polarized at right angles to each other and in which the polarization is substantially complete. That is, the preferred embodiment of the invention results in two rays each of which is at least 95% polarized.

According to the invention, such a beam splitter includes a multilayer material whose thicknesses are such that optical interference is used to control the ratio of the reflected to transmitted light and whose orientation is such with respect to the incident light that the light strikes the interfaces of the layers approximately at Brewster's angle to control the polarization of the beams. It is well known that at Brewster's angle the reflected light is 100% polarized. Therefore, if the total reflection is made to equal 50% of the incident light, all of the light vibrating perpendicular to the plane of reflection will be reflected, and hence, all of the transmitted light will also be polarized, but at right angles to the polarization of the reflected beam. This 50% reflection is approximately provided by the present invention, by including layers of alternately high and low index, with at least one of the layers having an optical thickness equivalent to a quarter-wavelength of the incident light. The effect is greatly enhanced by having several layers of alternating high and low index, with each layer having this effective quarter wavelength thickness. The acting thickness depends on the index of the material and on Brewster's angle within the material as will be pointed out in detail below. Another characteristic of Brewster's angle is that the reflected ray and refracted ray are at an angle of exactly 90°.

Using seven layers of alternating high and low index, I have found that the beams will be about 99.5% polarized for light of the exact wavelength and the exact angle of incidence specified. However, there is some tolerance allowed and, of course, some tolerance is necessary both in the angle of incidence and in the wavelength of the light. Even a collimated beam of light may have rays striking a beam splitter from angles differing as much as 5° from the axis of the beam but one would still get a useful amount of polarization from a beam splitter made according to the present invention. Similarly, the wavelength of the light may vary from ½ to ⅔ the value for which the layer thicknesses are exactly correct, without nullifying the utility of the present invention. Since the visible spectrum lies well within a range of wavelengths equivalent to one octave, a beam splitter made according to the present invention to be exact for a wavelength of about 550 millimicrons will be highly efficient throughout the visible spectrum.

For use in range finders and similar instruments, such a beam splitter can be made up in the form of a compound prism with the interfering layers between two components of the prism. The angle at which the light passes through each of the interfering layers is, as pointed out above, determined according to Brewster's angle. Hence, the angle at which the light passes through the glass or other material of which the prism components are made is fixed according to Snell's law. A preferred form of prism has the entrance and exit faces of the prism perpendicular to the light beams. In a simple beam splitter there is one entrance face and two exit faces to a prism. Each of these faces should be at an angle to the interfering layers equal to the required angle of incidence at the layers. The manner in which this angle may be varied will be apparent from the various examples described below in connection with the accompanying drawings, in which:

Figure 1:
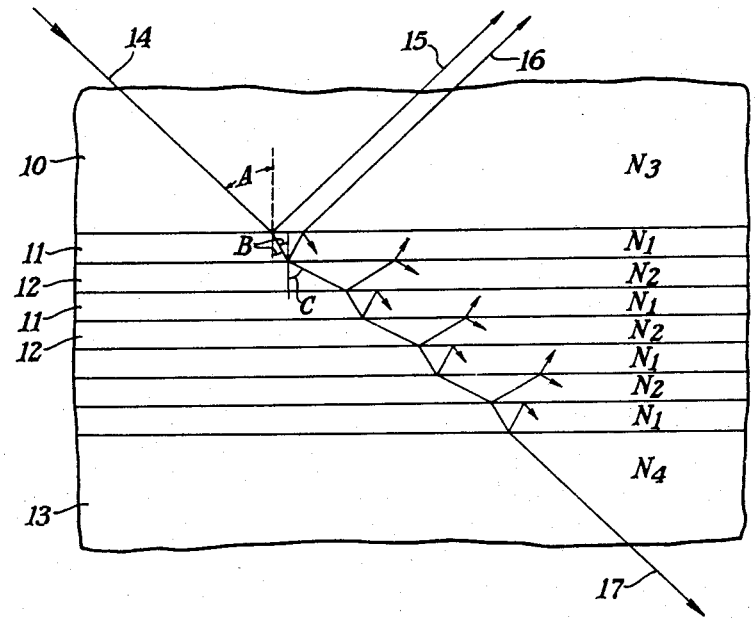
Fig. 1 is a greatly magnified cross-section of an interfering layer according to the invention.

In Fig. 1 a multilayer material made up of alternate layers 11 and 12 is between two transparent materials 10 and 13. A ray 14 strikes the interface between the layers 10 and 11 at an angle of incidence A and is refracted at an angle B such that $N_3 \sin A = N_1 \sin B$ where $N_3$ is the index of refraction of the layer 10 and $N_1$ is the index of refraction of the layer 11. The layers 10 and 12 have indices of refraction less than that of layer 11. The ray is refracted at the interface between the layer 11 and 12 so that $N_1 \sin B = N_2 \sin C$.

The angle A is selected so that $B+C=90°$; that is, so that the ray passes from the layer 11 into the layer 12 at Brewster's angle. As shown in Fig. 1 this ray continues to strike the successive interfaces at Brewster's angle. Of course, if $N_2=N_3$, the angle A will equal the angle C and will also be at Brewster's angle, but in general this is not convenient for two reasons which tend to conflict. The first reason is that in order to get the maximum effect with the least number of layers, the index $N_2$ should be as low as possible and the index $N_1$ should be as high as possible. If $N_3$ is selected to be approximately the same as $N_2$, the angle A becomes fairly large and for many purposes, one would prefer to have it equal to about 45°. On the other hand, one cannot have a material in which Brewster's angle is 45° and still get a high percentage of reflection from an interface, with available materials. Thus the best solution to these conflicting requirements is obtained with components whose index is intermediate to that of the layers; as in Fig. 1. In Fig. 1, if the index $N_4$ of the layer 13 equals $N_3$, the transmitted ray 17 is parallel to the incidental ray 14.

Thus the preferred embodiment of the invention has the index $N_3$ differ from $N_2$ and preferably between $N_1$ and $N_2$. Since the angle A is thus slightly different from the Brewster angle for $N_3$, the reflected ray 15 will have a small percent of unpolarized light in it. However, this has been taken into account in my calculations. The reflected ray 16, on the other hand, is completely polarized. As shown in Fig. 1 the successive reflected rays add up or subtract from the intensity of the reflected beam in accordance with interference laws, when the layers 11 and 12 are on the order of a wavelength of light.

In order to get the maximum reflection from each layer and to have these reflections add (specifically the amplitudes are added) the layers 11 and 12 are each made equivalent to a quarter wavelength layer for light passing through at the angle at which the ray 14 passes. That is, the thickness of the layer 11 must be $$\frac{\sqrt{N_1^2+N_2^2}}{N_1^2}$$

times the quarter wavelength of the light and the layer 12 must have a thickness of $$\frac{\sqrt{N_1^2+N_2^2}}{N_2^2}$$

times this quarter wavelength. At any interface, Brewster's angle depends on both indices of refraction and in the present invention, the optimum layer thicknesses are those effective at Brewster's angle; hence the layer thicknesses involve both indices in each case as indicated by the above mathematical expressions.

Figure 2:
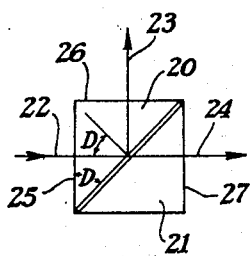
Figs. 2 and 3 show two forms of compound prisms using such a layer.

In Fig. 2 a compound prism including components 20 and 21 is made up so that the angle of incidence D is 45°. The incident ray 22 strikes a multilayer material located between the components 20 and 21 to give a transmitted ray 24 and a reflected ray 23. The entrance surface 25 and the exit surfaces 26 and 27 are all at 45° to the multilayer material.

Figure 3:
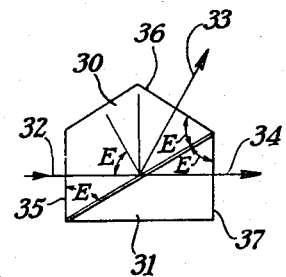

In Fig. 3 the components 30 and 31 are of a lower index of refraction so that the angle of incidence is E and the incident ray 32 and the reflected and transmitted rays 33 and 34 pass respectively through the entrance and exit faces 35, 36 and 37 perpendicularly, when these faces are at an angle E to the interlayer.

Figure 4:
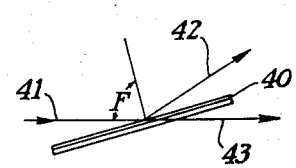
Fig. 4 shows a simple filter employing the invention.

In Fig. 4 the interlayer 40 is cemented between two planofilms and the incident light 41 is divided into a reflected ray 42 and a transmitted ray 43.

The theory of these three cases shown in Figs. 2, 3 and 4 will now be outlined briefly. Accepted terminology will be used wherein light is said to vibrate in a certain direction, which is its "direction" or "azimuth" of polarization and corresponds to its electric vector. A light ray striking a surface at an angle defines a plane containing the incident ray, the reflected ray, refracted ray, and the normal; this is the "plane of incidence" or the "plane of reflection." Azimuths $s$ and $p$ are respectively perpendicular and parallel to this plane and of course transverse to the direction the ray is travelling. From the Fresnel laws of reflection it is known that $$R_s = \frac{-\sin(\alpha-\beta)}{\sin(\alpha+\beta)}$$

$$R_p = \frac{\tan(\alpha-\beta)}{\tan(\alpha+\beta)}$$

$$T_s = \frac{2\sin\alpha\cos\beta}{\sin(\alpha+\beta)}$$

$$T_p = \frac{2\sin\alpha\cos\beta}{\sin(\alpha+\beta)\cos(\alpha-\beta)}$$

where $R_s$ and $R_p$ are the amplitudes of the reflected beams vibrating respectively perpendicular and parallel to the plane of reflection and $T_s$ and $T_p$ are transmitted amplitudes of these beams. More exactly, these are the proportions of the incident amplitude. Intensity is of course obtained by squaring the amplitude. $\alpha$ and $\beta$ are the angles of incidence and of refraction. When $\alpha+\beta=90°$, $R_p=0$ which means that the reflected ray is made up entirely of light vibrating perpendicular to the plane of reflection.

Figure 8:
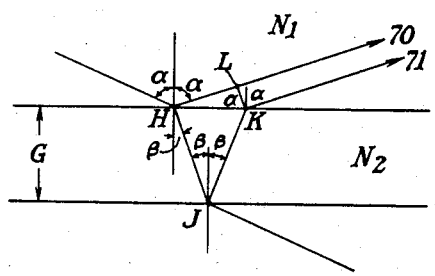
Fig. 8 shows the trigonometry within one layer, and Figs. 9 and 10 form part of a mathematical analysis of the phenomenon which occurs in the invention.

Further, when $\alpha+\beta=90$, it can be shown that (as in Fig. 8)

$$\tan\alpha = \frac{N_2}{N_1}$$

and $$\tan\beta = \frac{N_1}{N_2}$$

where $N_1$ and $N_2$ are the refractive indices of materials at the interface in question. Thus, the angles $\alpha$ and $\beta$ are fixed as soon as materials are selected. As applied to Fig. 1, this theory applies to the angles B and C. For example, if $N_1$ is 2.40 as for zinc sulfide and $N_2$ is 1.38 as for evaporated magnesium fluoride, the angle B is about 30° and the angle C is about 60°. To get an angle equal to about 45° in order to provide a prism of the shape shown in Fig. 2, the components must be made of a glass having an index of about $N_3=1.69$. With this arrangement $N_3 \sin A = N_1 \sin B$ which equals $$\frac{N_1 N_2}{\sqrt{N_1^2+N_2^2}}$$

With six interfaces as shown in Fig. 1 the total reflectance $R_s^2$ is over 99% for light of one wavelength polarized (in azimuth $s$) perpendicular to the plane of incidence and if this wavelength is selected in the green it is over 95% throughout the visible spectrum. From four interfaces the reflectance would be about 95.2% in the green and slightly less for the whole spectrum. Also, for a 1° shift in the angle of incidence, to allow for convergence or divergence of the incident beam, the reflectivity of light polarized parallel to the plane of incidence (i. e. azimuth $p$) would rise from zero only to about ½%, again assuming six interfaces. The tolerances for any other particular arrangement can be similarly computed.

In Fig. 3 a prism material is selected to have an index of refraction $N_3$ equal to that of the low index interfering layer, i. e. equal to $N_2$. If $N_1=2.4$ and $N_2=N_3=1.5$ the angle A should be such that sin A equals $$\frac{N_1}{\sqrt{N_1^2+N_2^2}}$$

Thus A equals 65° 40′ approximately. In Fig. 3 this angle is marked E to distinguish from the angle of incidence in Fig. 1.

In Fig. 4 the index of refraction of the plano-film layers binding the interfering multilayer may be neglected when computing the correct angle of incidence. The angle of incidence on this outer layer is the same as if the light were striking the face of the multilayers directly. From the equation $$\sin A = \frac{N_1 N_2}{\sqrt{N_1^2+N_2^2}}$$

it is seen that to give the Brewsterian relation within the multilayer the angle of incidence is independent of whether the high or low index layer comes first and if both $N_1$ and $N_2$ are greater than $$\sqrt{2}$$

this angle of incidence becomes imaginary. Of course when a layer of medium index is between one of lower index and one of higher index, its thickness must be equivalent to a half wavelength rather than a quarter wavelength to give addititive interference.

The reflectivity $R^2$ of X interfaces can be computed from the formula $$R = \tanh \left[ \sum_1^x \tanh^{-1} r \right]$$

where $r$ is the ratio of reflected to incident amplitude at each surface and the hyperbolic tangents are obtained from any suitable tables. This formula holds where all the layers have a thickness such that the reflectivities interfere additively. If the components have an index lower or higher than both of the layers, the layers immediately adjacent to the components should have a thickness equivalent to a half wavelength but the rest of the interlayers are equivalent to a quarter wavelength as above.

The formula used above for actual thickness can be computed trigonometrically from Fig. 8. The incident ray reaching the point H at an angle of incidence $\alpha$ is reflected toward L at an angle $\alpha$ and refracted toward J at an angle $\beta$. The refracted ray is reflected from J to K also at an angle $\beta$ and is then refracted at an angle $\alpha$. This is all apparent from the figure. The line KL is drawn perpendicular to the reflected ray so that the angle at L is 90°. The optical path difference which determines the interference between the ray 70 from H and the ray 71 from K equals HJ+JK−HL, since the line KL represents the wave front. Of course, the distances HJ and JK must be multiplied by $N_2$ since optical distance is the important factor and similarly the distance HL must be multiplied by $N_1$. Therefore, to give constructive interference which requires that the ray 70 and 71 be a half wave out of phase (the other half wave being provided by the known change of phase at one interface), $$\frac{\lambda}{2} = N_2(HJ+JK) - N_1(HL)$$

$$= \frac{2N_2 G}{\cos \beta} - N_1(HK) \sin \alpha$$

where G is the thickness of the layer $$= \frac{2GN_2}{\cos \beta} - N_1 \sin \alpha (2G \tan \beta)$$

but $N_1 \sin \alpha = N_2 \sin \beta$ and therefore $$\frac{\lambda}{2} = \frac{2GN_2}{\cos \beta}(1 - \sin^2 \beta)$$

$$= 2GN_2 \cos \beta$$

Therefore $$G = \frac{\lambda}{4N_2 \cos \beta}$$

But from the relationship for Brewster's angle, we know that $$\tan \beta = \frac{N_1}{N_2}$$

and therefore the thickness G must equal $$\frac{\lambda \sqrt{N_2^2+N_1^2}}{4N_1^2}$$

Figure 5:
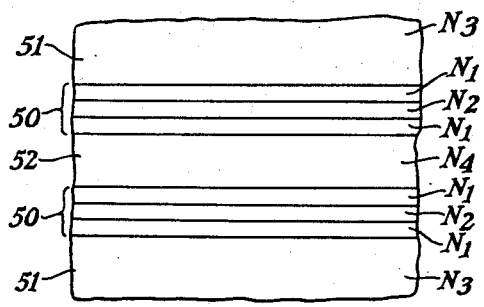
Fig. 5 shows an arrangement alternative to Fig. 1.

In Fig. 5, the layers 50 are first coated on prisms 51 and then are cemented together by a cement 52 having an index of refraction $N_4$. If the layer 52 is made thin enough, such an arrangement is satisfactory for most purposes. On the other hand, if the layer 52 has an appreciable thickness, this particular beam splitter is useful only in collimated light where the offset of the reflected beams does not interfere with the optical quality of the system in which the beam splitter is used.

Figure 6:
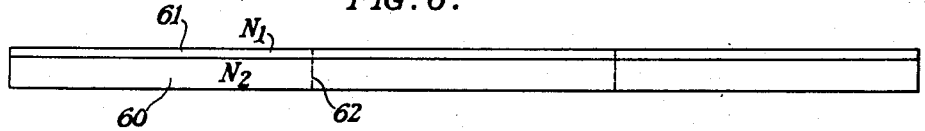
Fig. 6 shows a sheet material in cross section.
Figure 7:
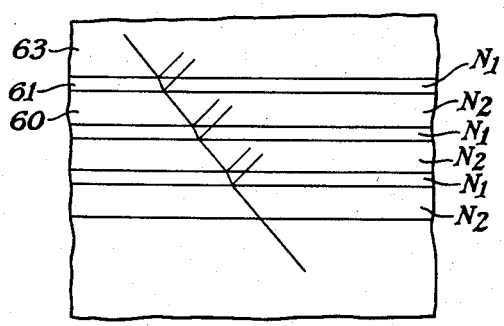
Fig. 7 shows a beam splitter made up from sections of the material shown in Fig. 6.

In Fig. 6 a thin supporting layer 60 having a low index of refraction (about 1.5 say) is coated with a quarter wavelength layer 61 (the quarter wavelength being computed at the proper angle of incidence as discussed above). Methods of coating such layers are described in Nadeau and Hilborn application 358,512, filed September 26, 1940. The resulting film is then cut into sections as shown by the broken lines 62 and a pile of layers is made as shown in Fig. 7. These layers are cemented together; the cemented layer is not shown and may have an index equal to $N_2$ so as to be ineffective optically. This pile is then cemented between materials 63 such as prisms having an index of refraction $N_3$ which may be equal to $N_2$ as discussed in connection with Fig. 3 or may be of any particular value required to give the desired angle of incidence as in Fig. 2. In Fig. 7 the multilayer material consists of a plurality of quarter wavelength layers 61 interleaved with relatively thick layers 60 and is hence most useful in a collimated beam.

*Mathematical analysis*

This analysis is included purely for mathematicians as an explanation of the theory involved in the reflection of light from multilayer films. It demonstrates, however, a phenomenon practically unique in nature. The desired reflectivity (of light vibrating perpendicular to the plane of incidence) varies with wavelength according to an oscillating function between 0 and 100% throughout the spectrum, but just before this function enters the visible spectrum it rises to a value greater than 95%, it remains there until it passes through the visible range, and then it reverts to its oscillating form. This efficiency of the invention throughout the visible spectrum is obviously most fortunate.

Figure 9:
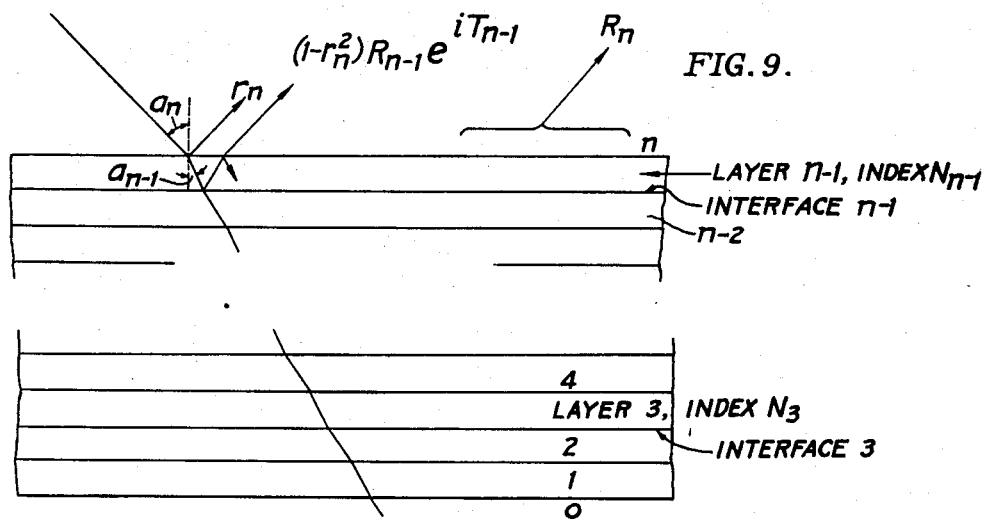

Consider a light beam of wavelength $\lambda$ incident upon a series of $n$ parallel non-scattering isotropic layers forming $n$ interfaces, the top layer being thick (e. g. the prism discussed above) and the top surface of the top layer hence not being involved in this analysis. The indices of the layers and of the bounding media are represented by $N_0$ to $N_n$ as shown in Fig. 9, the incident beam striking surface $n$ first and at an angle $a_n$. The subsequent angles are of course such that $$N_n \sin a_n = N_{n-1} \sin a_{n-1} = N_0 \sin a_0$$

The phase change $T$ introduced by the double traversal of any layer (the top thin layer $n-1$ say) as discussed in connection with Fig. 8 is equal to $$\frac{\pi G 4 N_{n-1} \cos a_{n-1}}{\lambda}$$

where $G$ is the thickness of the layer. For constructive interference $T$ must equal $\pi$ (or a multiple thereof); this simplification of the analysis will be introduced at the proper time. Also, due to the phase shift difference between reflection at a dense-rare interface and at the interface from the other side to give rare-dense conditions, any quantity representing phase change will be positive or negative depending on which way the beam strikes any surface in question.

Let $r_n$ be a symbol representing amplitude and phase change of a ray reflected from interface $n$ and let $R_n$ be a similar symbol of the total wave reflected from the $n$ interfaces, numbers 1 to $n$. Then by simply adding amplitudes for the multiple reflections, the total for $n$ interfaces is $$R_n = r_n + (1-r_n^2)R_{n-1}e^{iT_{n-1}}(1-r_n R_{n-1}e^{iT_{n-1}} +$$

$$r_n^2 R_{n-1}^2 e^{2iT_{n-1}} \ldots) = \frac{r_n + R_{n-1}e^{iT_{n-1}}}{1 + r_n R_{n-1}e^{iT_{n-1}}}$$

It will be noticed that for the last interface (number 1), $R_1 = r_1$. All of the amplitudes are measured in the bounding medium $n$ in the above expression. Complexities introduced by absorption in each layer are not here considered. From Fresnel's laws it is known that $r_n$ for light vibrating perpendicular to the plane of incidence $$= \frac{-\sin(a_n - a_{n-1})}{\sin(a_n + a_{n-1})}$$

and for light vibrating parallel to the plane of incidence $$= \frac{\tan(a_n - a_{n-1})}{\tan(a_n + a_{n-1})}$$

It happens that when the thickness of the layers is such that $T = k\pi$ where $k$ is an integer, the equation for reflectivity can be conveniently converted to one involving hyperbolic tangents and tables of these functions can then be used in calculating a particular value. When $T = k\pi$, $$R_n = \frac{r_n + (-1)^{k_{n-1}} R_{n-1}}{1 + (-1)^{k_{n-1}} r_n R_{n-1}}$$

Let $$R_n = \tanh P_n$$

and $$r_n = \tanh p_n$$

then $$\tanh P_n = \frac{\tanh p_n + (-1)^{k_{n-1}} \tanh P_{n-1}}{1 + (-1)^{k_{n-1}} \tanh p_n \tanh P_{n-1}}$$

$$= \tanh(p_n + (-1)^{k_{n-1}} P_{n-1})$$

Therefore, $$P_n = p_n + (-1)^{k_{n-1}} P_{n-1}$$

which may be expanded to its individual terms and added, and in general any value may be specifically calculated. When the layers consist of two substances alternating $r_n = -r_{n-1}$ and if the $k$ value for each layer is odd $$R_n = \tanh[n \tanh^{-1} r_{n-1}]$$

which is easy to calculate with tanh tables. Incidentally, if the $k$'s are even and $n$ is even $R_n$ is zero, but if $n$ is odd $R_n$ equals $r_n$.

In the specific zinc sulfide, magnesium fluoride case discussed above with angles of 30° and 60° in the two media, the reflected amplitude $r$ is .5 and 0 respectively for light vibrating perpendicular and parallel respectively to the plane of incidence. For six layers therefore (6 interfaces, the top layer being the prism)

$$R_6 = \tanh 6 \tanh^{-1} .5$$
$$= .9972$$

Since reflectivity is the square of the amplitude $R^2_6 = .9944$ for light vibrating perpendicularly and 0 for light vibrating parallel to the plane of incidence.

Now to find the effect of different wavelengths, assume that $T_n = \pi$ for $\lambda_0$, i. e., that the above computations were made for some standard wavelength $\lambda_0$. Thus we already know that for $\lambda = \lambda_0$, $T = \pi$ and $R_6$ (perpendicular) $= .9972$ and for $\lambda = \frac{1}{2}\lambda_0$, $T = 2\pi$ and $R_6$ (perpendicular) $= 0$. In fact $R_6 = .9972$ for $\lambda = \lambda_0$, $\frac{1}{3}\lambda_0$, $\frac{1}{5}\lambda_0$ etc. and equals zero for $\lambda = \frac{1}{2}\lambda_0$, $\frac{1}{4}\lambda_0$, etc. There are other wavelength values for which $R_6$ equals zero and the exact values can only be calculated by elaborating the original equation for $R_{n+1}$. The actual calculations are laborious, but for anyone interested in them, (1) the general equation and (2) the simplified equation for six layers of the same optical thickness and alternate layers of the same material are given below.

Figure 10:
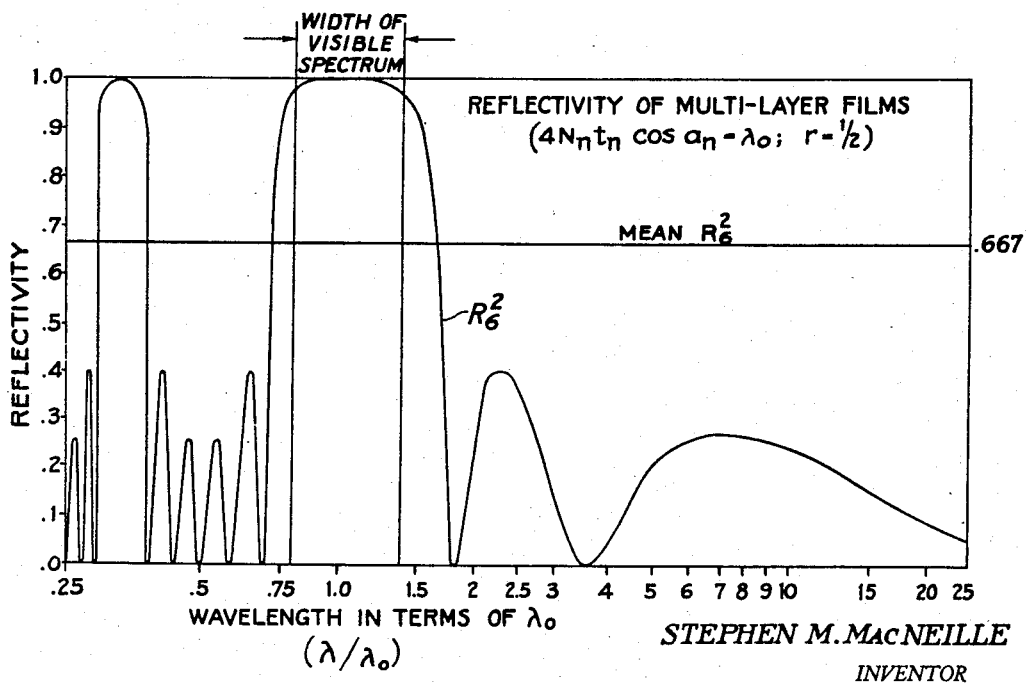

Figure 10 shows a graph of the second equation, the wavelength scale being given as a ratio, i. e., logarithmically.

General Equation 1

$$R_n = \sum_{j=1}^{n} r_j e^{i\theta_j} + \sum_{l>k>j=1}^{n} r_j r_k r_l e^{i(\theta_j - \theta_k + \theta_l)} + \ldots$$

all divided by $$1 + \sum_{k>j=1}^{n} r_j r_k e^{i(\theta_j - \theta_k)} +$$

$$\sum_{m>l>k>j=1}^{n} r_j r_k r_l r_m e^{i(\theta_j - \theta_k + \theta_l - \theta_m)} + \ldots$$

where $$\theta_j = \sum_{h=j}^{n-1} T_h \text{ etc.}$$

Six-layer Equation 2 (same thickness with alternate layers of the same material)

$$R_6 = r(-1 + e^{iT} - e^{2iT} + e^{3iT} - e^{4iT} + e^{5iT})$$
$$+ r^3(4e^{iT} - 6e^{2iT} + 6e^{3iT} - 4e^{4iT})$$
$$+ r^5(-3e^{2iT} + 3e^{3iT})$$

all divided by $$1 + r^2(-5e^{iT} + 4e^{2iT} - 3e^{3iT} + 2e^{4iT} - e^{5iT}$$
$$+ r^4(6e^{2iT} - 6e^{3iT} + 3e^{4iT})$$
$$- r^6 e^{3iT}$$

A plot of this last equation is shown in Fig. 10.

It will be noted in Fig. 10, that if the standard wavelength is $\lambda_0 = 510$ millimicrons (i. e., if the optical thickness of each layer is one quarter of 510 millimicrons at the angle at which light travels through that layer) the value of $R^2_s$ remains above 97% for the visible spectrum, and when this is integrated against the visibility curve would be about 99%.

Having thus described various embodiments of my invention, I wish to point out that it is not limited to these structures but is of the scope of the appended claims.

What I claim and desire to secure by Letters Patent of the United States is:

1. A multilayer material for polarizing light of wavelength $\lambda$ comprising a plurality of thin transparent layers each of which is of uniform thickness and forms a refracting interface with the adjacent layers, the alternating and intervening layers having different indices of refraction $N_1$ and $N_2$ respectively, the alternate layers each having a thickness $$\frac{\lambda\sqrt{N_1^2+N_2^2}}{4N_1^2}$$

and the intervening layers each having a thickness $$\frac{\lambda\sqrt{N_1^2+N_2^2}}{4N_2^2}$$

which causes constructive optical interference to light reflected at Brewster's angle and which hence causes increased reflectivity at said angle.

2. A multilayer material according to claim 1 having at least four interfaces spaced to give said constructive optical interference and hence to increase the ratio of reflected to transmitted light at Brewster's angle.

3. A multilayer material according to claim 1 having six interfaces spaced to give said constructive optical interference at Brewster's angle.

4. A multilayer material according to claim 1 in which the thicknesses are determined precisely with respect to the indices of refraction for green light.

5. A compound prism for beam splitting and polarizing light over a wave length range of $$\frac{\lambda}{2} \text{ to } \frac{3\lambda}{2}$$

said prism having two transparent components, one entrance and two exit faces, and sandwiched between the two components a plurality of thin transparent layers each of which is of uniform thickness and forms a refracting interface with the adjacent layers or components, alternate layers having one index of refraction $N_1$ and the intervening layer having a different index of refraction $N_2$, said alternate layers each having a thickness approximating $$\frac{\lambda\sqrt{N_1^2+N_2^2}}{4N_1^2}$$

and said intervening layers each having a thickness approximating $$\frac{\lambda\sqrt{N_1^2+N_2^2}}{4N_2^2}$$

the layers and components forming at least four interfaces and the entrance and exit faces of the prism being oriented to transmit light striking the interfaces between the layers at Brewster's angle.

6. A prism according to claim 5 in which the components have an index of refraction $N_3$ and the entrance and exit faces of the prism are each at angle A to the layers where $$\sin A = \frac{N_1 N_2}{N_3\sqrt{N_1^2+N_2^2}}$$

7. A prism according to claim 5 in which the alternate layers are zinc sulfide and the intervening layers are a fluoride.

8. A prism according to claim 5 in which the alternate layers have an index of refraction about 2.4 and the intervening layers have an index less than 1.55.

9. A prism according to claim 5 in which the alternate layers have an index $N_1$ about 2.4, the intervening layers have an index $N_2$ between 1.35 and 1.50, and the components have an index $N_3$ about 1.7.

10. A compound prism for polarizing light over the visible spectrum, said prism having two transparent components, one entrance and two exit faces, and sandwiched between the two components a plurality of thin transparent layers each of which is of uniform thickness and forms a refracting interface with the adjacent layers or components, alternate layers having one index of refraction $N_1$ and the intervening layers having a different index of refraction $N_2$, said alternate layers each having a thickness approximating $$\frac{140\sqrt{N_1^2+N_2^2}}{N_1^2}$$

millimicrons and said intervening layers each having a thickness approximating $$\frac{140\sqrt{N_1^2+N_2^2}}{N_2^2}$$

millimicrons, the layers and components forming at least four interfaces and the entrance and exit faces of the prism being oriented to transmit light striking the interface between the layers at Brewster's angle.

11. A prism according to claim 10 in which the components have an index of refraction $N_3$ and the entrance and exit faces of the prism are each at an angle A to the layers where $$\sin A = \frac{N_1 N_2}{N_3\sqrt{N_1^2+N_2^2}}$$

12. A prism according to claim 10 in which the components have an index of refraction $N_3$ where $$\frac{N_1 N_2}{N_3\sqrt{N_1^2+N_2^2}}$$

is approximately .7 and the components are 45 degree prisms with the layers between their hypotenuse faces.

STEPHEN M. MacNEILLE.

Certificate of Correction

Patent No. 2,403,731.  July 9, 1946.

STEPHEN M. MacNEILLE

It is hereby certified that errors appear in the printed specification of the above numbered patent requiring correction as follows: Column 1, lines 33 and 34, for "acting" read *actual*; column 5, line 15, for "65°" read *63°*; column 8, lines 55 and 56, for that portion of the equation reading "$e^{i(\theta_i - \theta_k + \theta_j + \theta_l - \theta_m)} +$"   read   $e^{i(\theta_i - \theta_k + \theta_l - \theta_m)} +$ and that the said Letters Patent should be read with these corrections therein that the same may conform to the record of the case in the Patent Office.

Signed and sealed this 8th day of October, A. D. 1946.

[SEAL]

LESLIE FRAZER,
*First Assistant Commissioner of Patents.*